(12) United States Patent
Jeon et al.

(10) Patent No.: US 6,342,579 B2
(45) Date of Patent: Jan. 29, 2002

(54) METHOD FOR PREPARING POLYESTER RESIN COPOLYMERIZED WITH 1,4-CYCLOHEXANEDIMETHANOL

(75) Inventors: Jae-Young Jeon; Yoon-Hee Hong, both of Kyunggido (KR)

(73) Assignee: SK Chemical Co., Ltd., Suwon-si (KR)

( * ) Notice: Subject to any disclaimer, the term of this patent is extended or adjusted under 35 U.S.C. 154(b) by 0 days.

(21) Appl. No.: 09/753,923

(22) Filed: Jan. 2, 2001

(30) Foreign Application Priority Data

May 17, 2000 (KR) .............................. 00-26495
Sep. 29, 2000 (KR) .............................. 00-57353

(51) Int. Cl.$^7$ .......................... C08G 63/78; G08K 5/49
(52) U.S. Cl. ..................... 528/279; 528/286; 528/287; 528/307; 528/308; 528/308.6; 528/298; 524/709; 524/783
(58) Field of Search ................ 528/279, 286, 528/287, 298, 307, 308.6; 524/709, 783

(56) References Cited

U.S. PATENT DOCUMENTS

| | | | | |
|---|---|---|---|---|
| 5,145,941 A | * | 9/1992 | Munday et al. ............. | 528/287 |
| 5,151,494 A | * | 9/1992 | Munday et al. ............. | 528/287 |
| 5,180,793 A | * | 1/1993 | Vigneault et al. ........... | 529/446 |
| 5,340,907 A | | 8/1994 | Yau et al. .................... | 528/74 |
| 5,385,773 A | | 1/1995 | Yau et al. .................... | 428/221 |
| 5,656,716 A | | 8/1997 | Schmist et al. ............. | 528/279 |

\* cited by examiner

Primary Examiner—Samuel A. Acquah
(74) Attorney, Agent, or Firm—Abelman, Frayne & Schwab

(57) ABSTRACT

Disclosed is a method for preparing polyester resins copolymerized with 1,4-cyclohexanedimethanol. In the preparation method, ethylene glycol and 1,4-cyclohexanedimethanol are fed with the molar ratio of the whole glycol component to terephthalic acid ranging from 1.3 to 3.0, and then esterified. Then, the esterified reaction product is polycondensed in the presence of titanium-based compound as a polycondensation catalyst and carboxy phosphonic acid typed compound represented by formula I below as a stabilizer, to give the polyester resins of the present invention having excellent clarity and good color:

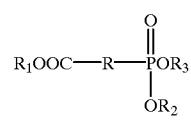

wherein $R_1$, $R_2$ and $R_3$, which are the same or different, each being selected from the group consisting of hydrogen, alkyl groups having 1 to 10 carbon atoms, cycloalkyl groups having 1 to 10 carbon atoms and aryl groups having 6 to 10 carbon atoms; and R is selected from the group consisting of alkylene groups having 1 to 10 carbon atoms, cycloalkylene groups having 1 to 10 carbon atoms, and arylene groups having 6 to 10 carbon atoms.

6 Claims, No Drawings

METHOD FOR PREPARING POLYESTER RESIN COPOLYMERIZED WITH 1,4-CYCLOHEXANEDIMETHANOL

BACKGROUND OF THE INVENTION

The present invention relates to a method for preparing a polyester resin copolymerized with 1,4-cyclohexanedimethanol. More specifically, the present invention relates to a method for preparing a polyester resin, in which polycondensation in the presence of a titanium-based compound as a catalyst and a carboxy phosphonic acid typed compound as a stabilizer yields a polyester resin copolymerized with 1,4-cyclohexanedimethanol, which is of high clarity with good color.

Recently, polyester resins copolymerized with 1,4-cyclohexanedimethanol have been increasing in commercial value, finding various applications, including packaging materials, molded articles, films, etc. In the past, such polyester resins were prepared by the addition of 1,4-cyclohexandimethanol upon the transesterification of dimethylterephthalate. However, the polyester is now produced from terephthalic acid; thus bringing about an improvement in the quality of the final product and an economic benefit. Such a technique is explained in U.S. Pat. Nos. 5,340,907 and 5,385,773. These patents disclose a process for producing copolyester having a dicarboxylic acid component and a glycol component, the dicarboxylic acid component comprising repeat units from 90 mol % terephthalic acid and the glycol component comprising repeat units from about 10 to 95 mol % 1,4-cyclohexanedimethanol and from about 90 to 5 mol % ethylene glycol.

DISCLOSURE OF THE INVENTION

Leading to the present invention, the intensive and thorough research on polyester resins, carried out by the present inventors aiming to avoid the problems encountered in prior arts, resulted in the finding that polycondensation in the presence of a titanium-based compound as a catalyst and carboxy phosphonic acid typed compound as a stabilizer yields a polyester resin copolymerized with 1,4-cyclohexanedimethanol, which is of excellent clarity with good color.

Accordingly, it is an object of the present invention to provide a method for preparing a polyester resin copolymerized with 1,4-cyclohexanedimethanol having improved clarity and color. The polyester resin of the present invention has a brighter color and lower metal content than those of a conventional polyester resin.

To achieve the object of the present invention, the method for preparing the polyester resin copolymerized with 1,4-cyclohexanedimethanol comprises the following steps of: esterifying terephthalic acid with a glycol component comprising ethylene glycol and 1,4-cyclohexanedimethanol at 230 to 270° C. under pressures of 0.1 to 3.0 kg/cm² with the molar ratio of the whole glycol component to terephthalic acid ranging from 1.1 to 3.0; and polycondensing said esterified reaction product at 250 to 290° C. under a reduced pressure of 400 to 0.1 mmHg in the presence of titanium-based compound as a polycondensation catalyst and carboxy phosphonic acid typed compound represented by the following formula I as a stabilizer:

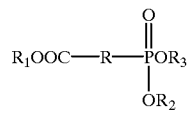

wherein $R_1$, $R_2$ and $R_3$, which are the same or different, each being selected from the group consisting of hydrogen, alkyl groups having 1 to 10 carbon atoms, cycloalkyl groups having 1 to 10 carbon atoms and aryl groups having 6 to 10 carbon atoms; and R is selected from the group consisting of alkylene groups having 1 to 10 carbon atoms, cycloalkylene groups having 1 to 10 carbon atoms, and arylene groups having 6 to 10 carbon; atoms.

DETAILED DESCRIPTION OF THE INVENTION

In preparing a polyester resin copolymerized with 1,4-cyclohexanedimethanol using terephthalic acid, ethylene glycol and 1,4-cyclohexanedimethanol, the glycol component comprising ethylene glycol and 1,4-cyclohexanedimethanol are primarily fed with the molar ratio of the whole glycol component to terephthalic acid ranging from 1.1 to 3.0 and then esterified at 230 to 270° C. under a pressure of 0.1 to 3.0 kg/cm². Available 1,4-cyclohexanedimethanol in the present invention may be in the form of a cis- or a trans-isomer or may be a mixture of both isomers. 1,4-cyclohexanedimethanol is added at an amount approximated to a desired mole % of the final polymer. In the present invention, 1,4-cyclohexanedimethanol amounts to 10 to 90 mole % of the whole glycol component so as to prevent the difficulties in polymer processing processes due to crystallization.

As for the esterification, it is preferably carried out at 240 to 270° C. and more preferably at 245 to 260° C. Meanwhile, the esterification time generally varies from 100 to 300 minutes, depending on reaction temperature, pressure, molar ratio of glycol to terephthalic acid. When a preparation method of polyester is divided into an esterification step and a polycondensation step as in the present invention, no catalysts are needed in the esterification.

The esterification can be carried out in a batch or continuous process. The raw materials can be separately fed, but the most preferable feeding form is a slurry of terephthalic acid in glycol.

After the esterification step is completed, the polycondensation step is carried out. In advance of the starting of the polycondensation step, a polycondensation catalyst is added to the esterified reaction product, along with a stabilizer and a color toning agent.

Generally, the polycondensation catalyst is selected from the group consisting of titanium, germanium, and antimony compounds. Among these, the titanium-based catalyst is the most advantageous since it is used at a smaller amount than the antimony-based catalyst and is less expensive than the germanium-based catalyst. Examples of the compounds useful as titanium-based catalysts include tetraethyl titanate, acetyltripropyl titanate, tetrapropyl titanate, tetrabutyl titanate, polybutyl titanate, 2-ethylhexyltitanate, octyleneglycol titanate, lactate titanate, triethanolamine titanate, acetylacetonate titanate, ethylacetoacetic ester titanate, isostearyl titanate, titanium dioxide, coprecipitate of titanium dioxide and silicon dioxide, coprecipitate of titanium dioxide and zirconium dioxide. These compounds may be used alone or in combination. The catalyst is used at the amount of 5 to 100 ppm as based on the titanium element in the final polymer. The catalyst has an influence on the color of the final polymer. Other factors affecting the color include the stabilizer and the color toning agent to be used.

Generally, stabilizers used in the polycondensation are exemplified by phosphoric acid and trimethylphosphate, and triethylphosphate. In the present invention, a carboxy phosphonic acid typed compound represented by the following formula I is used as a stabilizer to obtain the best color and reactivity.

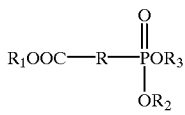

I wherein $R_1$, $R_2$ and $R_3$, which are the same or different, each being selected from the group consisting of hydrogen, alkyl groups having 1 to 10 carbon atoms, cycloalkyl groups having 1 to 10 carbon atoms and aryl groups having 6 to 10 carbon atoms; and R is selected from the group consisting of alkylene groups having 1 to 10 carbon atoms, cycloalkylene groups having 1 to 10 carbon atoms, and arylene groups having 6 to 10 carbon atoms.

Representative of the carboxy phosphonic acid typed compounds, triethylphosphonoacetate is more stable in heat than conventional stabilizers, thus minimize the formation of degradation products and residues. Also, the carboxy phosphonic acid typed stabilizer of the present invention shows lower volatility than that of the stabilizers used in the prior art. Additionally, corrosion to equipments and toxicity can be reduced owing to the use of the carboxy phosphonic acid typed stabilizers of the present invention, compared with the conventional stabilizer. The stabilizer of the present invention is used at an amount of 10 to 150 ppm of phosphorus element based on the final polymer and preferably at an amount of 10 to 100 ppm. For example, if the amount of the stabilizer is less than 10 ppm, an insufficient stabilizing effect results, causing the polymer to undergo yellowing. On the other hand, if the amount exceeds 150 ppm, a desired polymerization degree cannot be obtained.

With regard to the color toning agent which is added to improve the color of the polymer, examples thereof include cobalt acetate, cobalt propionate and etc. This agent is added at an amount of 0 to 100 ppm based on the weight of the final polymer. An organic compounds, in addition to those color toning agents, may be used to control the color of the polymer.

At 250 to 290° C. under a reduced pressure of 400 to 0.1 mmHg, the polycondensation step is carried out for a period of time required for the polymer to reach a desired inherent viscosity. A preferable reaction temperature for the polycondensation is within the range of 265 to 280° C. The reduced pressure condition is also for the purpose of eliminating glycol. After completion of the polycondensation, a desired polyester resin copolymerized with 1,4-cyclohexanedimethanol can be obtained.

A better understanding of the present invention may be obtained in light of the following examples which are set forth to illustrate, but are not to be construed to limit the present invention. The term "parts" as used in the Examples and the Comparative Examples are on a weight basis unless otherwise stated. Also, the term "ppm" for catalysts and stabilizers refers to weight of the active elements thereof and is based on the weight of the final polymer. Also, the presented physical properties were measured as follows.

Inherent Viscosity (IV): a product was dissolved in ortho-chlorophenol to the final concentration of 0.12% at 150° C. and then its inherent viscosity was measured with a Ubbelohde typed viscometer in a thermostat maintained at 35° C.

Color: a product was analyzed for color by use of the Colorgard System, manufactured by Pacific Scientific.

EXAMPLE 1

In a 3L reactor equipped with a stirrer and a discharging condenser were placed 996 parts of terephthalic acid, 294 parts of 1,4-cyclohexanedimethanol and 618 parts of ethylene glycol, which was then pressurized with nitrogen to the pressure of 2.0 kg/cm². While the temperature of the reactor was slowly elevated to 255° C., the materials were allowed to undergo esterification. Water which was produced as a result of the esterification was discharged out of the reactor. After completion of the esterification, which could be recognized by the ceasing of the water production, the reaction product in the above reactor was transferred to a polycondensation reactor equipped with a stirrer, a cooling condenser and a vacuum system. To the esterification reaction product, a coprecipitate of titanium dioxide and silicon dioxide was added at an amount of 40 ppm of Ti element based on the final polymer, triethylphosphonoacetate at an amount of 60 ppm of P element based on the final polymer, and cobalt acetate at an amount of 80 ppm of Co element based on the final polymer. While the inner temperature of the reactor was raised from 240° C. to 275° C., ethylene glycol was discharged over 40 minutes during low vacuum reaction in which the pressure was reduced from atmospheric pressure to 50 mmHg. Then, while the pressure of the reactor was reduced to 0.1 mmHg, the polycondensation reaction was further carried out polycondensed until a desired inherent viscosity was obtained. The resulting polymer was discharged out of the reactor and cut in the form of chips. 1,4-cyclohexanedimethanol-copolymerized polyester resin thus prepared was measured for inherent viscosity and color by way of the method described above. Additionally, the measured inherent viscosity and color, together with the reaction conditions, are given in Table 1, below.

COMPARATIVE EXAMPLES 1–3

These comparative examples were carried out in the same manner as in Example 1, except that stabilizers were used as shown in the following Table 1. The measured inherent viscosity and color, along with the reaction conditions, are given in Table 1, below.

TABLE 1

| Example No. | Stabilizer | Polycon. Temp. (° C.) | I.V. (dL/g) | Color-b (Yellowness) |
|---|---|---|---|---|
| Example 1 | Stabilizer-1 | 275 | 0.785 | 1.4 |
| C. Example 1 | Stabilizer-2 | 275 | 0.782 | 3.3 |
| C. Example 2 | Stabilizer-3 | 275 | 0.782 | 8.1 |
| C. Example 3 | Stabilizer-4 | 275 | 0.775 | 9.9 |

Note:
Stabilizer-1: Triethylphosphonoacetate
Stabilizer-2: Phosphoric acid
Stabilizer-3: Triethylphosphate
Stabilizer-4: Distearylpentaerythroldiphosphite

EXAMPLE 2

In a 1000 mL reactor equipped with a stirrer and a discharging condenser were placed 199.2 parts of terephthalic acid, 58.8 parts of 1,4-cyclohexanedimethanol and 123.5 parts of ethylene glycol, which was then pressurized with nitrogen to the pressure of 1.0 kg/cm². While the temperature of the reactor was slowly elevated to 255° C., the materials were allowed to undergo esterification. Water which was produced as a result of the esterification was discharged out of the reactor. After completion of the esterification, which could be recognized by the ceasing of the water production, the reaction product in the above reactor was transferred to a polycondensation reactor equipped with a stirrer, a cooling condenser and a vacuum system. To the esterified reaction product, a tetraprophyl titanate was added at an amount of 50 ppm of Ti element based on the final polymer, triethylphosphonoacetate at an amount of 70 ppm of P element based on the final polymer, and cobalt acetate at an amount of 80 ppm of Co element based on the final polymer. While the inner temperature of the reactor was raised from 240° C. to 270° C., ethylene glycol was discharged over 40 minutes during low vacuum reaction in which the pressure was reduced from atmospheric pressure to 50 mmHg. Then, while the pressure of the reactor was reduced to 0.1 mmHg, the polycondensation reaction was further carried out until a desired inherent viscosity was obtained. The resulting polymer was discharged out of the reactor and cut in the form of chips. 1,4-cyclohexanedimethanol-copolymerized polyester resin thus prepared was measured for inherent viscosity and color by way of the method described above. Additionally, the measured inherent viscosity and color, together with the reaction conditions, are given in Table 2, below.

COMPARATIVE EXAMPLES 4–6

These comparative examples were carried out in the same manner as in Example 2, except that stabilizers were used as shown in the following Table 2. The measured inherent viscosity and color, along with the reaction conditions, are given in Table 2, below.

TABLE 2

| Example No. | Stabilizer | Polycon. Temp. (° C.) | I.V. (dL/g) | Color-b (Yellowness) |
|---|---|---|---|---|
| Example 2 | Stabilizer-1 | 270 | 0.805 | 2.2 |
| C. Example 4 | Stabilizer-2 | 270 | 0.785 | 5.6 |
| C. Example 5 | Stabilizer-3 | 270 | 0.789 | 8.7 |
| C. Example 6 | Stabilizer-4 | 270 | 0.781 | 10.7 |

Note:
Stabilizer-1: Triethylphosphonoacetate
Stabilizer-2: Phosphoric acid
Stabilizer-3: Triethylphosphate
Stabilizer-4: Distearylpentaerythroldiphosphite

EXAMPLE 3

In a 1000 mL reactor equipped with a stirrer and a discharging condenser were placed 199.2 parts of terephthalic acid, 58.8 parts of 1,4-cyclohexanedimethanol and 123.5 parts of ethylene glycol, which was then pressurized with nitrogen to the pressure of 1.0 kg/cm². While the temperature of the reactor was slowly elevated to 255° C., the materials were allowed to undergo esterification. Water which was produced as a result of the esterification was discharged out of the reactor. After completion of the esterification, which could be recognized by the ceasing of the water production, the reaction product in the above reactor was transferred to a polycondensation reactor equipped with a stirrer, a cooling condenser and a vacuum system. To the esterification reaction reactor, a tetrabutyl titanate was added at an amount of 50 ppm of Ti element based on the final polymer, triethylphosphonoacetate at an amount of 70 ppm of P element based on the final polymer, and cobalt acetate at an amount of 70 ppm of Co element based on the final polymer. While the inner temperature of the reactor was raised from 240° C. to 275° C., ethylene glycol was discharged over 40 minutes during low vacuum reaction in which the pressure was reduced from atmospheric pressure to 50 mmHg. Then, while the pressure of the reactor was reduced to 0.1 mmHg, the polycondensation reaction was carried out until a desired inherent viscosity was obtained. The resulting polymer was discharged out of the reactor and cut in the form of chips. 1,4-cyclohexanedimethanol-copolymerized polyester resin thus prepared was measured for inherent viscosity and color by way of the method described above. Additionally, the measured inherent viscosity and color, together with the reaction conditions, are given in Table 3, below.

COMPARATIVE EXAMPLES 7–8

These comparative examples were carried out in the same manner as in Example 3, except that stabilizers were used as shown in the following Table 3. The measured inherent viscosity and color, along with the reaction conditions, are given in Table 3, below.

TABLE 3

| Example No. | Stabilizer | Polycon. Temp. (° C.) | I.V. (dL/g) | Color-b (Yellowness) |
|---|---|---|---|---|
| Example 3 | Stabilizer-1 | 275 | 0.787 | 3.7 |
| C. Example 7 | Stabilizer-2 | 275 | 0.780 | 5.9 |
| C. Example 8 | Stabilizer-3 | 275 | 0.772 | 9.2 |

Note:
Stabilizer-1: Triethylphosphonoacetate
Stabilizer-2: Phosphoric acid
Stabilizer-3: Triethylphosphate

EXAMPLE 4

In a 1000 mL reactor equipped with a stirrer and a discharging condenser were placed 199.2 parts of terephthalic acid, 58.8 parts of 1,4-cyclohexanedimethanol and 123.5 parts of ethylene glycol, which was then pressurized with nitrogen to the pressure of 1.0 kg/cm². While the temperature of the reactor was slowly elevated to 255° C., the materials were allowed to undergo esterification. Water which was produced as a result of the esterification was discharged out of the reactor. After completion of the esterification, which could be recognized by the ceasing of the water production, the reaction product in the above reactor was transferred to a polycondensation reactor equipped with a stirrer, a cooling condenser and a vacuum system. To the esterified reaction product, a coprecipitate of titanium dioxide and silicon dioxide was added at an amount of 50 ppm of Ti element based on the final polymer, triethylphosphonoacetate at an amount of 50 ppm of P element based on the final polymer, and cobalt acetate at an amount of 60 ppm of Co element based on the final polymer. While the inner temperature of the reactor was raised from 240° C. to 270° C., ethylene glycol was discharged over 40 minutes during low vacuum reaction in which the pressure was reduced from atmospheric pressure to 50 mmHg. Then, while the pressure of the reactor was reduced to 0.1 mmHg, the polycondensation reaction was further carried out until a desired inherent viscosity was obtained. The resulting polymer was discharged out of the reactor and cut in the form of chips. 1,4-cyclohexanedimethanol-copolymerized polyester resin thus prepared was measured for inherent viscosity and color by way of the method described above. Additionally, the measured inherent viscosity and color, together with the reaction conditions, are given in Table 4, below.

COMPARATIVE EXAMPLE 9

This comparative example was conducted in the same manner as in Example 4, except that phosphoric acid was used as stabilizer. The results are given in Table 4, below.

TABLE 4

| Example No. | Stabilizer | Polycon. Temp. (° C.) | I.V. (dL/g) | Color-b (Yellowness) |
|---|---|---|---|---|
| Examp. 4 | Triethyl-phosphono-Acetate | 270 | 0.782 | 4.5 |
| C. Examp. 9 | Phosphoric acid | 270 | 0.780 | 5.8 |

As can be seen in the results of Examples and Comparative Examples, according to the present invention, the polyester resins copolymerized with 1,4-cyclohexanedimethanol, which have an excellent inherent viscosity and a good color, can be prepared in the presence of titanium-based compounds as polycondensation catalysts and carboxy phosphonic acid typed compounds as stabilizers. Also, although the amount of the stabilizer used in the present invention is equal to or smaller than that of stabilizers in the prior art, the color of the prepared polyester resin has the same or brighter color as before. Thus, the present invention can lower the metal content in the polyester resin to improve clarity and color.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed:

1. A method for preparing polyester resins copolymerized with 1,4-cyclohexanedimethanol comprising the steps of:
    esterifying terephthalic acid with a glycol component comprising ethylene glycol and 1,4-cyclohexanedimethanol; and
    polycondensing said esterified reaction product at 250 to 290° C. under a reduced pressure of 400 to 0.1 mmHg in the presence of titanium-based compound as a polycondensation catalyst and carboxy phosphonic acid typed compound represented by the following formula I as a stabilizer;

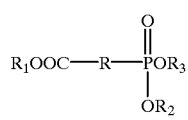

wherein $R_1$, $R_2$ and $R_3$, which are the same or different, each being selected from the group consisting of hydrogen, alkyl groups having 1 to 10 carbon atoms, cycloalkyl groups having 1 to 10 carbon atoms and aryl groups having 6 to 10 carbon atoms; and R is selected from the group consisting of alkylene groups having 1 to 10 carbon atoms, cycloalkylene groups having 1 to 10 carbon atoms, and arylene groups having 6 to 10 carbon atoms.

2. The method as defined in claim 1, wherein the 1,4-cyclohexanedimethanol amounts to 10 to 90 mol % of the whole glycol component.

3. The method as defined in claim 1, wherein the carboxy phosphonic acid typed compound is triethylphosphonoacetate.

4. The method as defined in claim 1, wherein the carboxy phosphonic acid typed compound is used at an amount of 10 to 150 ppm of P element based on the final polymer.

5. The method as defined in claim 1, wherein the titanium-based compound is selected from the group consisting of tetraethyl titanate, acetyltripropyl titanate, tetrapropyl titanate, tetrabutyl titanate, polybutyl titanate, 2-ethylhexyl titanate, octyleneglycol titanate, lactate titanate, triethanolamine titanate, acetylacetonate titanate, ethylacetoacetic ester titanate, isostearyl titanate, titanium dioxide, coprecipitate of titanium dioxide and silicon dioxide, coprecipitate of titanium dioxide and zirconium dioxide and mixtures thereof.

6. The method as defined in claim 1, wherein the titanium-based compound is used at an amount of 5 to 100 ppm of Ti element based on the final polymer.

* * * * *